US009908962B2

(12) United States Patent
Gordon et al.

(10) Patent No.: US 9,908,962 B2
(45) Date of Patent: Mar. 6, 2018

(54) MECHANORESPONSIVE HEALING POLYMERS

(71) Applicant: The United States of America represented by the Administrator of the National Aeronautics and Space Administration, Washington, DC (US)

(72) Inventors: Keith L. Gordon, Hampton, VA (US); Emilie J. Siochi, Newport News, VA (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 14/329,528

(22) Filed: Jul. 11, 2014

(65) Prior Publication Data
US 2016/0009845 A1    Jan. 14, 2016

(51) Int. Cl.
*C08F 293/00* (2006.01)
*C08C 19/25* (2006.01)
*C08C 19/20* (2006.01)
*C08F 255/08* (2006.01)

(52) U.S. Cl.
CPC ............ *C08F 293/00* (2013.01); *C08C 19/20* (2013.01); *C08C 19/25* (2013.01); *C08F 255/08* (2013.01)

(58) Field of Classification Search
CPC ....... C08C 19/25; C08C 19/20; C08F 255/08; C08F 271/00; C08F 297/06
See application file for complete search history.

(56) References Cited

U.S. PATENT DOCUMENTS 8,063,171 B2    11/2011  Klein
2011/0124435 A1*  5/2011  Ehlers ................ A63B 53/0466
                                                  473/345

OTHER PUBLICATIONS

Hickenboth et al., Biasing reaction pathways with mechanical force, Nature (London, United Kingdom) (2007), 446(7134), 423-427.*
White, S.R., Sotto, N.R., Geubelle, P.H., Moore, J.S., Kessler, M.R., Sriram, S.R., Brown, E.N., Viswanathan, S., "Autonomic Healing of Polymer Composites," Nature, 2001, 409, 794-797.
Pang, J.W., Bond, I.P, "Bleeding composites'-damage detection and self-repair using a biomimetic approach," Composites Part A: Applied Science and Manufacturing, 2005, 36(2), 183-188.
Pang, J.W., Bond, I.P., "A hollow fibre reinforced polymer composite encompassing self-healing and enhanced damage visibility," Composites Science and Technology, 2005, 65 (11-12), 1791-1799.
Dry, C., "Passive Tuneable Fibers and Matrices," Int. J Mod Phys B, 1992; 6(15-16), 1992, 2763-2771.

Dry, C., McMillan W., "Three-part Methylmethacrylate adhesive system as an internal delivery system for smart responsive concrete," Smart Mater Struct, 1996, 5(3), 297-300.
John, M., Li, G., "Self-healing of sandwich structures with a grid stiffened shape memory polymer syntactic foam core," Smart Mater Struct, 19, 2010, 075013-075024, pp. 1-12.
Nji, J., Li, G., "A self-healing 3D woven fabric reinforced shape memory polymer composite for impact mitigation," Smart Mater Struct, 19, 2010, 035007-035015, pp. 1-9.
Meure, S., Furman, S., Khor, S., "Poly[ethylene-co-(methacrylic acid)] Healing Agents for Mendable Carbon Fiber Laminates," Macromol Mater Eng., 2010; 295, pp. 420-424.
Chen, X., Wudl, F., Mal, A.J., Shen H., Nutt, S.,R., "New Thermally Rememdable Highly Cross-Linked Polymeric Materials," Macromolecules, 2003, 36, pp. 1802-1807.
Chen, X., Dam, M., Ono, K., Mal, A., Shen, H., Nutt, S., Hera, "A Thermally Re-mendable Cross-Linked Polymeric Material," Science, 2002, 295, 1698-1702.
Wojtecki, R., Meador, M., Rowan, S.J., "Using the dynamic bond to access macroscopically responsive structurally dynamic polymers," Nature Materiais, 2011, 10, pp. 14-27.
Cheng, S.; Mather, B. D.; Long, T. E., "Taking Advantage of Non-Covalent Interactions in the Design of Self-Healing Polymers," Polymer Preprints, 2008, 49(1), pp. 978-979.
Cordier, P., Tournilhac, F., Soulie'-Ziakovic, C., Leibler,L., "Self-healing and thermoreversible rubber from supramolecular assembly," Nature, 2008, 451, pp. 977-980.
Canadell, J., Goossens, H., Klumperman, B., "Self-Healing Materials Based on Disulfide Links," Macromolecules, 2011, 44, pp. 2536-2541.
Deng, G., Tang, C., Li, F., Jiang, H., Chen, Y., "Covalent Cross-Linked Polymer Gels with Reversible Sol-Gel Transition and Self-Healing Properties," Macromolecules, 2010, 43, pp. 1191-1194.
Lantman, C.W., Macknight, W.J., "Structural Properties of Ionomers," Annual Rev. Mat., 1989, 19, pp. 295-317.
Hird, B., Eisenberg, A., "Sizes and Stabilities of Multiplets and Clusters in Carboxylated and Sulfonated Styrene Ionomers," Macromolecules, 1992, 25, pp. 6466-6474.
Varley, R.J., Van Der Zwaag, S., "Towards an understanding of thermally activated self-healing of an ionomer system during ballistic penetration," Acta Materialia, 2008, 56, pp. 5737-5750.
Varley, R.J., Van Der Zwaag, S., "Autonomous damage initiated healing in a thermo-responsive ionomer," Polym Int, 2010, 59, pp. 1031-1038.
John F. Henahan, "Setting the world of nitrile chemistry afire," Chem. Eng. News, 49, 27, pp. 16-18, Jul. 1971.

(Continued)

*Primary Examiner* — Jeffrey C Mullis
(74) *Attorney, Agent, or Firm* — Jennifer L. Riley; Robin W. Edwards; Mark P. Dvorscak (57) ABSTRACT

Methods are provided to produce new mechanoresponsive healing systems. Additionally, various embodiments provide a two tier self-healing material system concept that provides a non-intrusive method to mitigate impact damage in a structure ranging from low velocity impact damage (e.g., crack damage) to high velocity impact damage (e.g., ballistic damage.) The various embodiments provide the mechanophore linked polymer PBG-BCB-PBG. The various embodiments provide methods for synthesizing PBG-BCB-PBG.

5 Claims, 9 Drawing Sheets

(56) References Cited

OTHER PUBLICATIONS

Ahmed Iraqi, Shirley Seth, Colln A. Vincent, David J. Cole-Hamilton and (in part) Michael D. Watkinson, Isla M. Graham and Dawn Jeffrey, "Catalytic Hydrosilation of polybutadienes as a Route to functional Polymers," J. Mater. Chem., 1992, 2(10), pp. 1057-1064.

Y. Thomas, J.P. Parisi, B. Boutevin, D. Beziers, E. Chataignier and G. Desarmot, "Improvement of Fibre/Matrix Bonding in Carbon-Fibre/Acrylic Composites by Electron-Irradiation: Concept of Difunctional Chemical Coupling Agent," Composites Science and Technology, 52, 299-307, (1994).

Lee, C. K.; Davis, D. A.; White, S. R.; Moore, J. S.; Sottos, N. R. Braun, P. V. "Force-Induced Redistribution of a Chemical Equilibrium". J. Am. Chem. Soc. 2010, 132, 16107-16111.

Caruso, Mary M.; Davis, Douglas A.; Shen, Qilong; Odom, Susan A.; Sottos, Nancy R.; White, Scott R.; Moore, Jeffrey S. "Mechanically-Induced Chemical Changes in Polymeric Materials" Chem. Rev., 2009, 109 (11), pp. 5755-5798.

Davis, Douglas A., et al. "Force-induced activation of covalent bonds in mechanoresponsive polymeric materials" Nature 459, 68-72 (May 7, 2009).

A.D. Antoine, A. V Dean and S. G. Gilbert, "Alteration of Acrylonitrile-Methylacrylate-Buta diene Terpolymer by Nocardia rhodochrous and Penicillium notatum," Applied and Evironmental Microbiology, 39(4), pp. 777-781 (1980).

G. Gordon Cameron, M. Younus Qureshi, "Grafting of Polybutadiene Functionalised with Chlorosilane Groups," Makromol. Chem., Rapid Commun. 2, pp. 287-291 (1981).

Jean-Francois Gohy, Christelle Charlier, Jian-Xin, Zhang, Philippe Dubois, and Robert Jerome, "Synthesis of novel polybutadiene-graft-poly(sodium methacrylate) amphiphilic copolymers as precursors for liquid crystalline graft copolymers," Macrormol. Chem. Phys. 200, 1999, pp. 1630-1638.

Tamio Hayashi and Yasuhiro Uozumi, "Catalytic asymmetric synthesis of optically active alcohols via hydrosilylation of olefins with a chiral monophosphine-palladium catalyst," Pure & Appl. Chem., 64(12), pp. 1911-1916, 1992.

K. Gordon, R. Penner, P. Bogert, W.T. Yost, and E. Siochi, "Puncture Self-healing Polymers for Aerospace Applications", Abstr. Pap. Am. Chem. Soc., 2011, 242.

Burnworth, M., Tang, L., Kumpfer, J., Duncan, A., Beyer, F., Fiore, G., Rowan, S., Weder, C., "Optically healable supramolecular polymers," Nature, 472, Apr. 2011, pp. 334-337.

Joseph G. Smith, Jr., "An Assessment of Self-Healing Fiber Reinforced Composites," Jan. 2012, NASA/TM-2012-217325, pp. 1-21.

Stephen James Kalista, Jr., M.S. thesis titled, "Self healing Thermoplastic Poly(Ethylene-co-Methacrylic Acid) Copolymers Following Projectile Puncture" submitted to the faculty of Virginia Polytechnic Institute and State University, Blacksburg, VA Sep. 1, 2003, pp. 1-32.

Stephen James Kalista, Jr., M.S. thesis titled, "Self healing Thermoplastic Poly(Ethylene-co-Methacrylic Acid) Copolymers, Following Projectile Puncture" submitted to the faculty of Virginia Polytechnic Institute and State University, Blacksburg, VA Sep. 1, 2003, pp. 33-63.

Rebecca Fall, M.S. thesis entitled, "Puncture reversal of ethylene Ionomers—Mechanistic Studies" submitted to the faculty of Virginia Polytechnic Institute and State University, Blacksburg, VA Aug. 29, 2001, pp. 1-30.

Rebecca Fall, M.S. thesis entitled, "Puncture reversal of ethylene Ionomers—Mechanistic Studies" submitted to the faculty of Virginia Polytechnic Institute and State University, Blacksburg, VA Aug. 29, 2001, pp. 31-62.

* cited by examiner

MECHANORESPONSIVE HEALING POLYMERS

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Exploration, and in particular space exploration, is an intrinsically risky and expensive proposition, therefore there is great incentive to look for ways to achieve exploration safely and affordably. Typically it requires about $10,000 per pound to launch mass into orbit. Therefore, there is great interest in finding innovative ways to reduce mass of objects to be sent into orbit. Weight savings may be realized by using more damage tolerant systems to avoid carrying extra weight for replacement sections and repair components. Self-healing materials provide for improved damage tolerance in load bearing structures, and a means of self-mitigation, or self-reliability for overall vehicle health and durability. The self-healing phenomaterials capable of puncture healing upon impact show great promise for space exploration applications wherein an internal structural breach caused by micrometeoroid impacts, which could be catastrophic for the astronaut crew, would be self-contained to allow the retention of air pressure to the greatest extent possible. This approach is also applicable to other pressure vessel type structures which may have critical requirements with regard to a contained fluid (e.g. fuel tanks).

Self-healing materials display the unique ability to mitigate incipient damage and have built-in capability to substantially recover structural load transferring ability after damage. In recent years, researchers have studied different "self-healing, mechanisms" in materials as a collection of irreversible thermodynamic paths where the path sequences ultimately lead to crack closure or resealing. Crack repair in polymers using thermal and solvent processes, where the healing process is triggered with heating, or with a solvent, have been studied. A second approach involves the autonomic healing concept, were healing is accomplished by dispersing a microencapsulated healing agent and a catalytic chemical trigger within an epoxy resin to repair or bond crack faces and mitigate further crack propagation. Another related approach, the microvascular concept, utilizes brittle hollow glass fibers (in contrast to microcapsules) filled with epoxy hardener and uncured resins in alternating layers, with fluorescent dye. An approaching crack ruptures the hollow glass fibers, releasing heating agent into the crack plane through capillary action. A third approach utilizes a polymer that can reversibly re-establish its broken bonds at the molecular level by either thermal activation (i.e., based on Diels-Alder rebonding), or ultraviolet light. A fourth approach utilizes structurally dynamic polymers, which are materials that produce macroscopic responses from a change in the materials molecular architecture without heat or pressure. A fifth approach involves integrating self-healing resins into fiber reinforced composites producing self-healing fiber reinforced composites. Various chemistries have been used in the aforementioned approaches.

The aforementioned self-healing approaches address the repair, or mitigation, of crack growth and various damage conditions in materials, but have the following disadvantages: 1) Slow rates of healing; 2) Use of foreign inserts in the polymer matrix that may have detrimental effects on composite fiber performance; 3) Samples have to be held in direct contact, or under load and for fused together under high temperature for long periods of time 4) Do not address damage incurred by ballistic or hypervelocity impacts; and/ or 5) May not be considered a structural load bearing material.

Materials that are capable of puncture healing upon impact show great promise for space exploration applications wherein an internal breach caused by micrometeoroid impacts which would normally be considered catastrophic would now be self-contained. This type of material also provides a cross-cutting route for improved damage tolerance in load bearing structures and a means of self-mitigation or self-reliability in respect to overall vehicle health and aircraft durability. In puncture healing materials, healing is triggered by the ballistic or damage event. (Ballistics tests are used to simulate micro-meteoroid damage in lab tests). The force of the bullet on the material and the materials response to the bullet (viscoelastic properties) activates healing in these materials. Polymers such as DuPont's Surlyn®, Dow's Affinity™ EG8200G, and INEO's Barex™ 210 IN (PBG) have demonstrated healing capability following penetration of fast moving projectiles—velocities that range from 9 mm bullets shot from a gun (~300 m/sec) to close to micrometeoroid debris velocities of 3-5 km/sec. Unlike other self-healing methodologies described above, these materials inherently self-heal in microseconds due to their molecular design. For example, Surlyn® is an ionomer that contains ionic groups at low concentrations (<15 mol %) along the polymer backbone. In the presence of oppositely charged ions, these ionic groups form aggregates that can be activated by external stimuli such as temperature or ultraviolet irradiation. Surlyn®, undergoes puncture reversal (self-healing) following high velocity ballistic penetration (300 m/s-5 km/sec). The heat generated from the damage event triggers self-healing in this material. However, DuPont's Surlyn®, is not considered a load bearing material and INEO's Barex 210 IN is not puncture healing at temperatures lower than 50° C. These materials were not originally designed to be self-healing. However, their puncture-healing behavior is a consequence of the combination of viscoelastic properties under the conditions induced by projectile penetration.

BRIEF SUMMARY OF THE INVENTION

Various embodiment methods are provided to produce new mechanoresponsive healing systems. Additionally, various embodiments provide a two tier self-healing material system concept that provides a non-intrusive method to mitigate impact damage in a structure ranging from low velocity impact damage (e.g., crack damage) to high velocity impact damage (e.g., ballistic damage.) The various embodiments provide the mechanophore linked polymer PBG-BCB-PBG. The various embodiments provide methods for synthesizing PBG-BCB-PBG.

One embodiment of the invention is a self-healing mechanophore linked polymer including PBG-BCB-PBG.

Another embodiment of the invention is a method of making a self-healing mechanophore linked PBG-BCB-PBG polymer by combining acrylonitrile with methacrylate to form poly(methacrylate-co-acrylonitrile), end-capping the poly(methacrylate-co-acrylonitrile) with bromobenzocyclobutene to form end-capped poly(methacrylate-co-acrylonitrile), combining, acrylonitrile with butadiene to torn poly(butadiene-co-acrylonitrile), and block grafting the poly (butadiene-co-acrylonitrile) to the end-capped poly(methacrylate-co-acrylonitrile) to from the PBG-BCB-PBG polymer.

Another embodiment of the invention is a method of making a self-healing mechanophore linked PBG-BCB-PBG polymer by epoxidizing an alkene bond on a grafted poly(butadiene-co-acrylonitrile) on a PBG polymer backbone, ring opening the resulting epoxide by chlorosilanes, and performing living anionic polymerization with the PBG functionalized with chlorosilane groups and coupling it with living anions of poly(butadiene) and end-capping it with bromocyclobutene to form the PBG-BCB-PBG polymer.

Yet another embodiment of the invention is a Method of making a self-healing mechanophore linked PBG-BCB-PBG polymer by free radical polymerization or crosslinking/vulcanization of a PBG polymer, wherein a targeted group is an alkene on a grafted poly(butadiene-co-acrylonitrile) elastomer of the PBG polymer and the PBG polymer is initiated with a free radical initiator bis(triethoxysilylpropyl) disulfide in a solvent N-methylpyrrolidone NMP at 125° C. under a flow of nitrogen; and end-capping the polymerized or crosslinked/vulcanized PBG with bromocyclobutene to terminate the polymerization and form the PBG-BCB-PBG polymer.

These and other features, advantages, and objects or the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
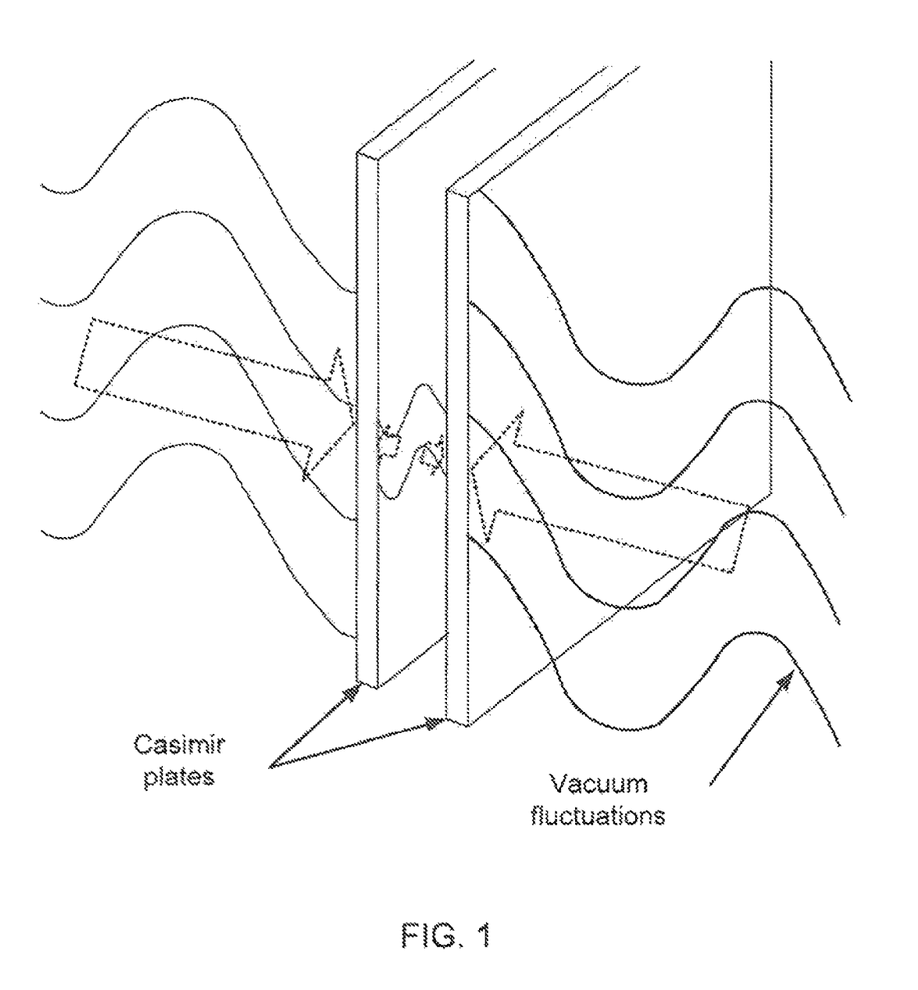
FIG. 1 is a schematic diagram illustrating casimir forces on parallel plates.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations am for illustrative purposes, and are not intended to limit the scope of the invention or the claims.

The various embodiments use an unconventional polymer synthetic route to develop lightweight, self-healing structural materials to enable more damage tolerant systems. Various embodiments involve the molecular design of polymers with compositions that contain mechanoresponsive chemical functional groups and the determination of synthetic conditions—chemical and mechanical force—needed to induce reactions to form polymers with properties that can support the requirements for structural components.

The various embodiments describe how to develop novel lightweight self-healing system where self-repair is induced by the forces imparted by the damage event itself. The self-healing may result because damage is induced by an energetic source (e.g., high velocity projectile impact). By designing the molecular composition of a polymer to contain mechanoresponsive functional groups, the various embodiments induce self-healing through the transformation of such chemical groups to a state where mechanical properties of the structure are almost completely restored, within fractions of seconds after the damage event occurs. Such a fast recovery rate may be based on the existence of non-engineered puncture healing materials capable of sealing a hole resulting from projectile penetration within microseconds of the event. The forces imparted by the damage event may be used to enable healing or repair of the structure. The ability of the materials of the various embodiments to autonomically react to changes in their environment lends itself to potential applications that mitigate some of the risks that have been identified for long duration human exploration beyond low Earth orbit ("LEO"). In this regard, the various embodiments provide a mechanoresponsive healing polymer material, capable of not only repairing puncture damage, but also crack damage. The various embodiment materials may be developed by incorporating the mechanophore, bromocyclobutene, into the backbone of the puncture healing polymer, Barex™ 210 IN (PBG). The various embodiments provide several synthetic routes to prepare the new polymer.

Various embodiment methods are provided to produce new mechanoresponsive healing systems. Additionally, various embodiments provide a two tier self-healing material system concept that provides a non-intrusive method to mitigate impact damage in a structure ranging from low velocity impact damage (e.g., crack damage) to high velocity impact damage (e.g., ballistic damage.)

The various embodiments provide self-healing structural materials that offer better mechanical properties than current self-healing materials. As examples, the various embodiments provide self-healing structural materials that provide healing capability at elevated temperatures compared with current self-healing materials, faster healing rates (e.g., less than 100 microseconds) than current self-healing materials, healing without the need of foreign inserts or fillers, and/or healing at a wider damage regime (e.g., from microcrack damage to ballistic puncture damage) than current self-healing materials.

The various embodiments provide self-healing structural materials to enable damage tolerant systems for aerospace and aviation having applications to NASA missions including, but not limited to: 1) secondary or primary structures in aircraft or spacecraft; 2) micrometeoroid and orbital debris ("MMOD") protection; 3) cost efficient repairable wind power blades; and 4) wire insulation material.

Exploration beyond LEO subjects both humans and space vehicles/infrastructure to risks, such as space radiation exposure and orbital debris impact damage, the latter of which can prove to be catastrophic. Affordable solutions to mitigate these risks include lightweight solutions such as polymeric self-healing materials, specifically materials capable of high rates of self-healing from high velocity micrometeoroid debris impacts. An approach for the realization of self-healing spacecraft may include incorporation of self-healing materials into its structural components.

Self-healing materials display the unique ability to mitigate incipient damage and have built-in capability to substantially recover structural load transferring ability following the damage event. Certain chemical functional groups may react in response to the application of external forces to effect chemical transformations.

The various embodiments may take advantage of external forces to induce chemical changes in a material designed to regain its structural integrity in response to what would normally be damaging forces. Such forces may be harnessed during chemical reactions to induce interesting chemistries. For example, applied force (Casimir, ultrasound, etc.) may be used to facilitate chemical transformation in polymers. All chemical reactions, whether facilitated by thermal, photochemical, or mechanical stimuli, proceed via the lowest energy pathway. Polymer mechanochemistry may selectively alter the reaction coordinate along the pathway to a desired product (e.g., through the stabilization of the transition state). By introducing mechanically sensitive chemical groups or mechanophores into polymer strands, the directional nature of mechanical forces may selectively break and re-form covalent bonds. Micro-crack formation and propagation in composite structures (on the atomistic level) may be the result of the breaking of covalent bonds. By incorporating mechanophores into the chains of a polymer, the forces that ultimately lead to crack formation and de-laminations in composite structures, may now contribute to crack healing and the realization of more damage tolerant systems. In this regard, several polymer mechanophores systems may be utilized. For example, cyclobutane bearing acrylate polymers exhibit enhanced scission kinetics under the application of pulsed ultrasound leading to the production of functional chain-end acrylates in a net [2+2] cycloreversion. Others nonscissile mechanophores may include benzocyclobutenes, atropisomeric biaryls, epoxides, spiropyrans, pyrophospates and oxanobonadiene.

Current structural materials (epoxies) are not healable, making it necessary to depend on complicated and potentially destructive repair methods and long down times. The various embodiment self-healing structural materials are lightweight, robust, and durable. The healability of the materials is a function of inherent physical properties of the created matrix and not foreign inserts. The various embodiments take advantage of what is otherwise a destructive force and based on the embodiment designs of the material composition react positively (e.g., covalent bond formation) rather than negatively (e.g., bond-breaking) to this external force.

The various embodiments provide a polymer that may be used in structural applications providing a solution to mitigate risks from catastrophic micrometeoroid damage and enabling safer long duration exploration. The various embodiments provide self-healing materials with molecular designs that yield the necessary combination of viscoelastic properties to enable healing. In this manner, the various embodiments may shorten the time required for development of the molecular design and synthesis prototyping of mechanoresponsive materials. Additionally, the self-healing behavior of the various embodiment materials may address and mitigate damage regimes other than projectile impact damage, such as crack growth.

Figure 2:
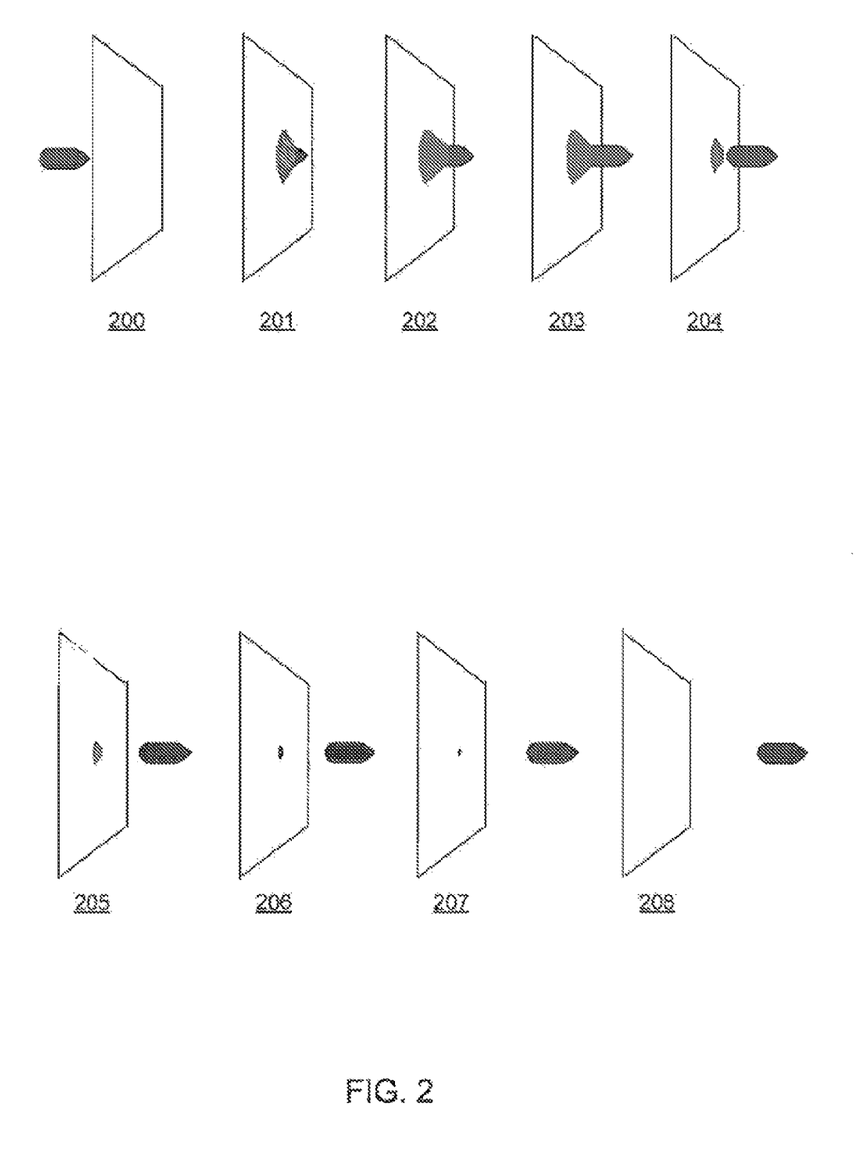
FIG. 2 is a schematic diagram illustrating thermoplastic puncture repair healing polymers.

FIG. 1 illustrates Casimir forces acting on parallel plates in a vacuum. The Casimir forces, similar to van der Waals force, arise when materials are placed in close proximity to each other, e.g. a few nanometers, such as less than 5 nanometers. The Casimir forces, van der Waals force, and thermal energy, alone or in combination, may be harnessed to drive the self-healing behavior of the embodiment materials discussed in more detail below. FIG. 2 illustrate the puncture healing concept Puncture healing in the various embodiment materials may be the result of the synergistic combination of viscoelastic properties that the polymers possess. Self-healing behavior may occur upon projectile puncture whereby energy must be transferred to the material during impact both elastically and inelastically thus establishing two requirements for puncture healing to occur: 1) The need for the puncture event to produce a local melt state in the polymer material; and 2) The molten material has to have sufficient melt elasticity to snap back and close the hole. Ballistic testing studies have revealed that Surlyn® materials heated to a temperature of ~98° C. during projectile puncture (3° C. higher than Surlyn's® melting temperature) may display self-healing behavior. Additional ballistic testing studies conducted revealed that Surlyn® materials heated to a temperature ~240° C. during projectile puncture may display self-healing behavior. The temperature increase produces a localized flow state and the melt elasticity to snap back, thus closing the hole (as illustrated in FIG. 2 in which images 200, 201, 202, 203, 204, 205, 206, 207, and 208 show the material before, during, and after projectile puncture). In studies conducted at NASA Langley Research Center, high speed video recording was used to capture footage of the puncture healing mechanism at the puncture site during a ballistics test conducted at various temperatures for various self-healing polymers. The mechanism of healing for the respective polymers begins by the tip of the bullet punching a hole through the panel as it penetrates the panel (image 201 of FIG. 2), while pushing out polymer material through the exit of the panel before it exits. The strong force of the impact may cause acoustic modal waves to propagate through the material. There may be no pulling of the material, but there may be a viscoelastic stress wave response in the radial direction of the bullet, where the modal wave may push the material uniformly inward and outward. The heat generated by the penetration of the projectile facilitates self-healing, when the local material around the penetration site melts and flows to close the hole (images 204 to 208 of FIG. 2).

The various embodiments provide molecular design of polymers with compositions that include mechanoresponsive chemical functional groups and the determination of synthetic conditions—chemical and mechanical force—needed to induce reactions to form polymers with properties that may support the requirements for structural components. More specifically, by chemically introducing mechanophores into the structure of a puncture healing resin, the various embodiments may provide self-healing resins created with the ability to autonomously react to mechanical stimuli over a wider damage regime (e.g., from cracks up to ballistic puncture). Thus, the various embodiments utilize this transformation to provide a new class of self-healing polymers, while previous efforts have only sought to demonstrate the viability of mechanophores or to broadly screen for putative mechanophore activity.

The various embodiment mechanophore—linked polymers are based on the mechanophore, bromocyclobutene, and the puncture healing resin INEO's Barex 210 IN (PBG). INEO's Barex 210 IN may demonstrate puncture healing when shot at a temperature of 50° C. and above. Puncture healing has been observed to occur within 300 microseconds in Barex 210 IN materials. INEO's Barex 210 IN has a reported tensile modulus of 3.3 GPA, which makes it attractive for structural applications as a carbon fiber reinforced composite matrix resin material. The mechanophore, bromocyclobutene, has been demonstrated to undergo a mechanochemical induced electrocyclic ring opening when subjected to pulsed sonication and in the presence N-(1-pyrne) maleimide.

Figure 3:
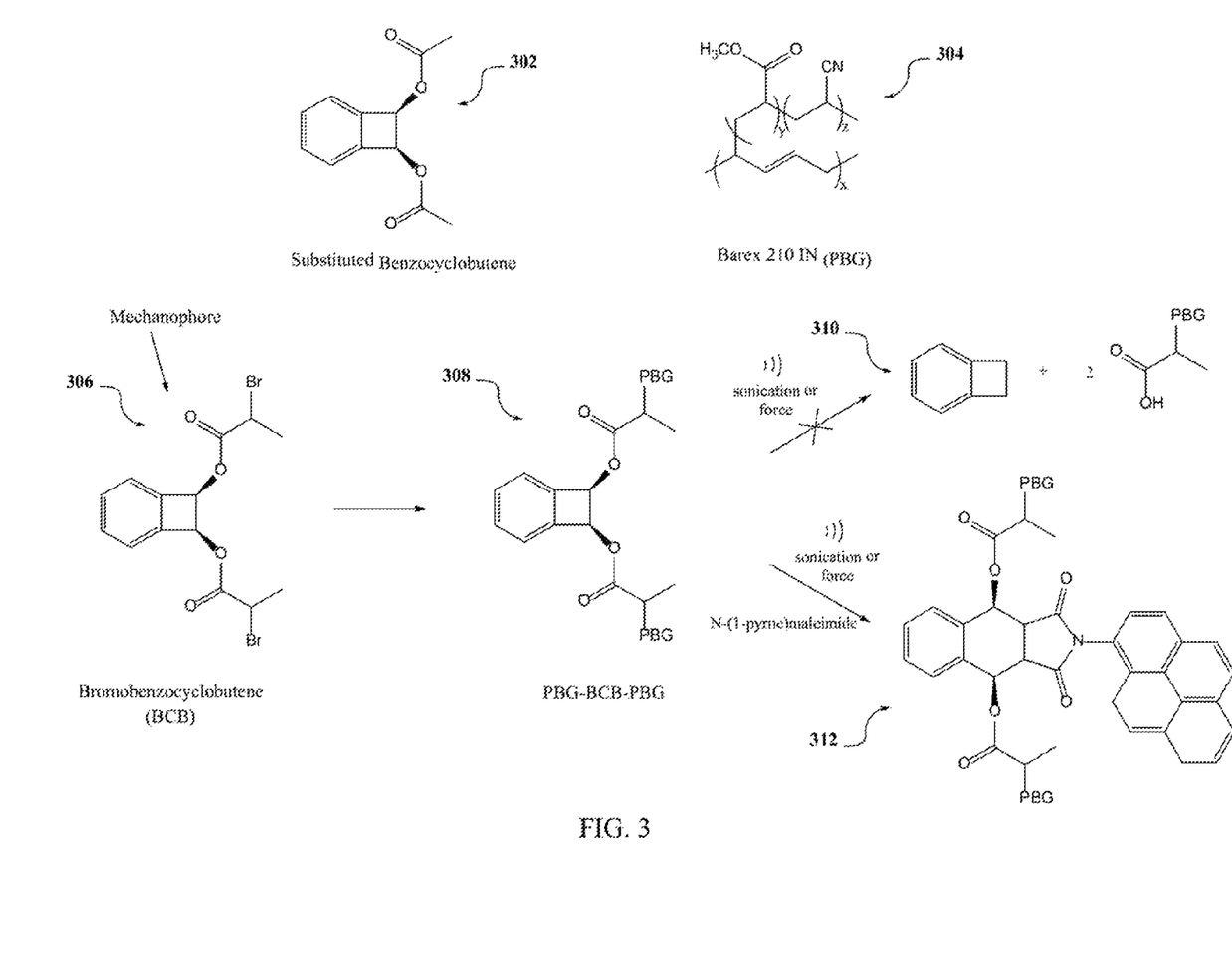
FIG. 3 is a scheme showing synthesis of a benzocyclobutene mechanophore-linked polymer PBG-BCB-PBG and a subsequent mechanochemical reaction.

An embodiment mechanophore linked polymer, PBG-BCB-PBG (308) and subsequent mechanochemical reaction is shown in FIG. 3. FIG. 3 illustrates the chemical structure of benzocyclobutene (302) and Barex™ 210 IN (PBG) (304) which may be used in the various embodiments. For Barex™ 210 IN (PBG) (304), x may range from 5-15 mol %, y may range from 75-85 mol %, and z may range from 15-25 mol %. The chemical structures for the mechanophore bromobenzocyclobutene (306) and the mechanophore linked polymer (PBG-BCB-PBG) (308) are shown in FIG. 3. Also shown in FIG. 3 are potential self-healing pathways and the resulting chemical structures (310) and (312). As force is applied to the PBG-BCB-PBG system (308) or as the material undergoes some damage event, two pathways may be followed. Pathway 1 may lead to chain scission or covalent bond breaking resulting in chemical structure (310). Pathway 2 may lead to a subsequent mechanochemical reaction or covalent bond formation resulting in chemical structure (312). As the polymer undergoes applied force or a damage event, instead of damage being incurred by the material (308), the material (308) rather uses the damage event involved to heal itself or reform bonds, thus maintaining integrity of the material or structure (312).

Figure 4:
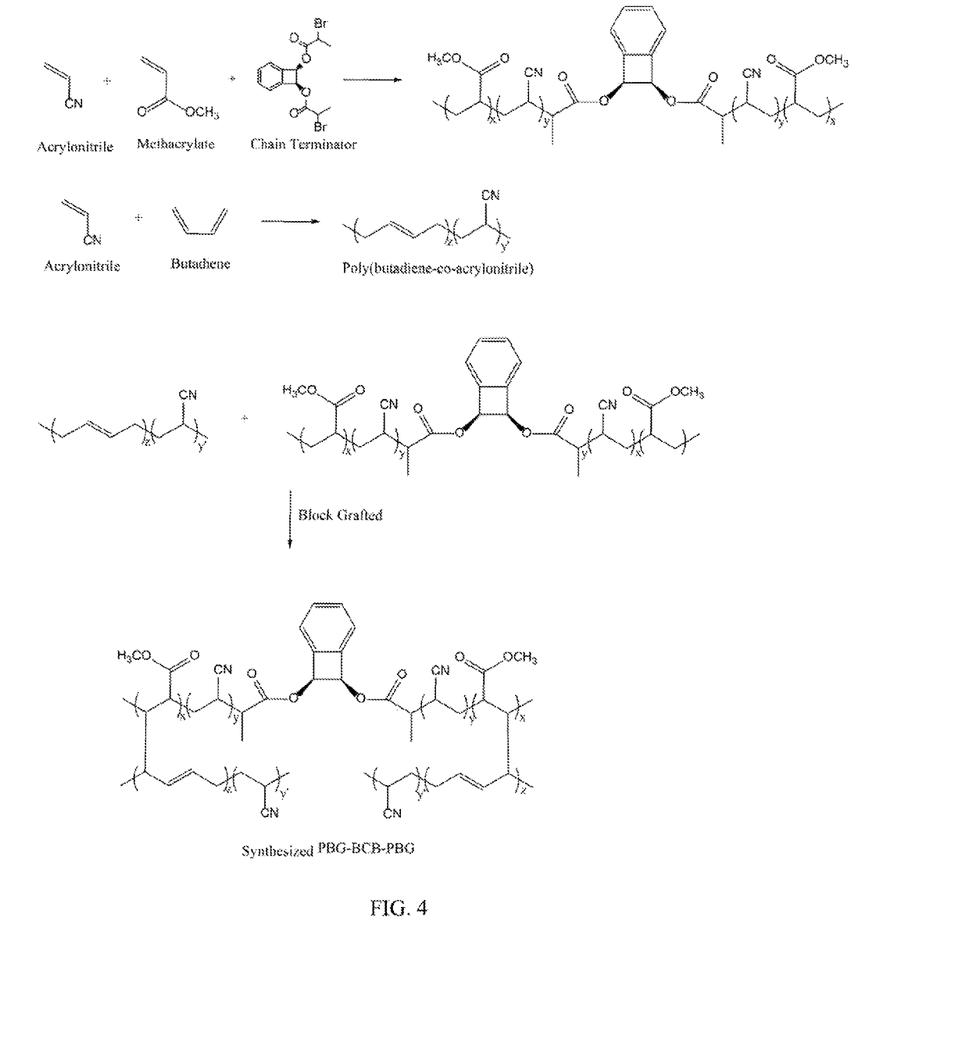
FIG. 4 illustrates a method of synthesizing PBG-BCB-PBG according to an embodiment.

In an embodiment mechanophore addition may be performed via end-group chemistry (e.g., emulsion polymerizations). FIG. 4 illustrates a scheme showing synthesis of PBG-BCB-PBG according to an embodiment. This synthetic route may involve use of a modified emulsion polymerization, such as the modified emulsion polymerization by Standard Oil of Ohio. The process may use two separate copolymerizations. The modification includes the copolymer poly(methacrylate-co-acrylonitrile) being end-capped with bromobenzocyclobutene. A subsequent step includes both copolymers, poly(methacrylate-co-acrylonitrile) and poly(butadiene-co-acrylonitrile) being grafted by chain extension. The first copolymer may comprises 65-85 wt/wt % acrylonitrile and 15-35 wt/wt % methacrylate, such as 70-80 wt/wt % acrlonitrile and 20-30 wt/wt % methacrylate, such as 75 wt/wt % acrylonitrile and 25 wt/wt % methacrylate. The second copolymer may comprise 55-85 wt/wt % butadiene and 15-45% acrylonitrile, such as 60-80 wt/wt % butadiene and 20-40% acrylonitrile, such as 70 wt/wt % butadiene and 30 wt/wt % acrylonitrile. These two copolymers may be block grafted in the ratio of 13:1, respectively, to form the mechanophore linked polymer PBG-BCB-PBG.

Figure 5:
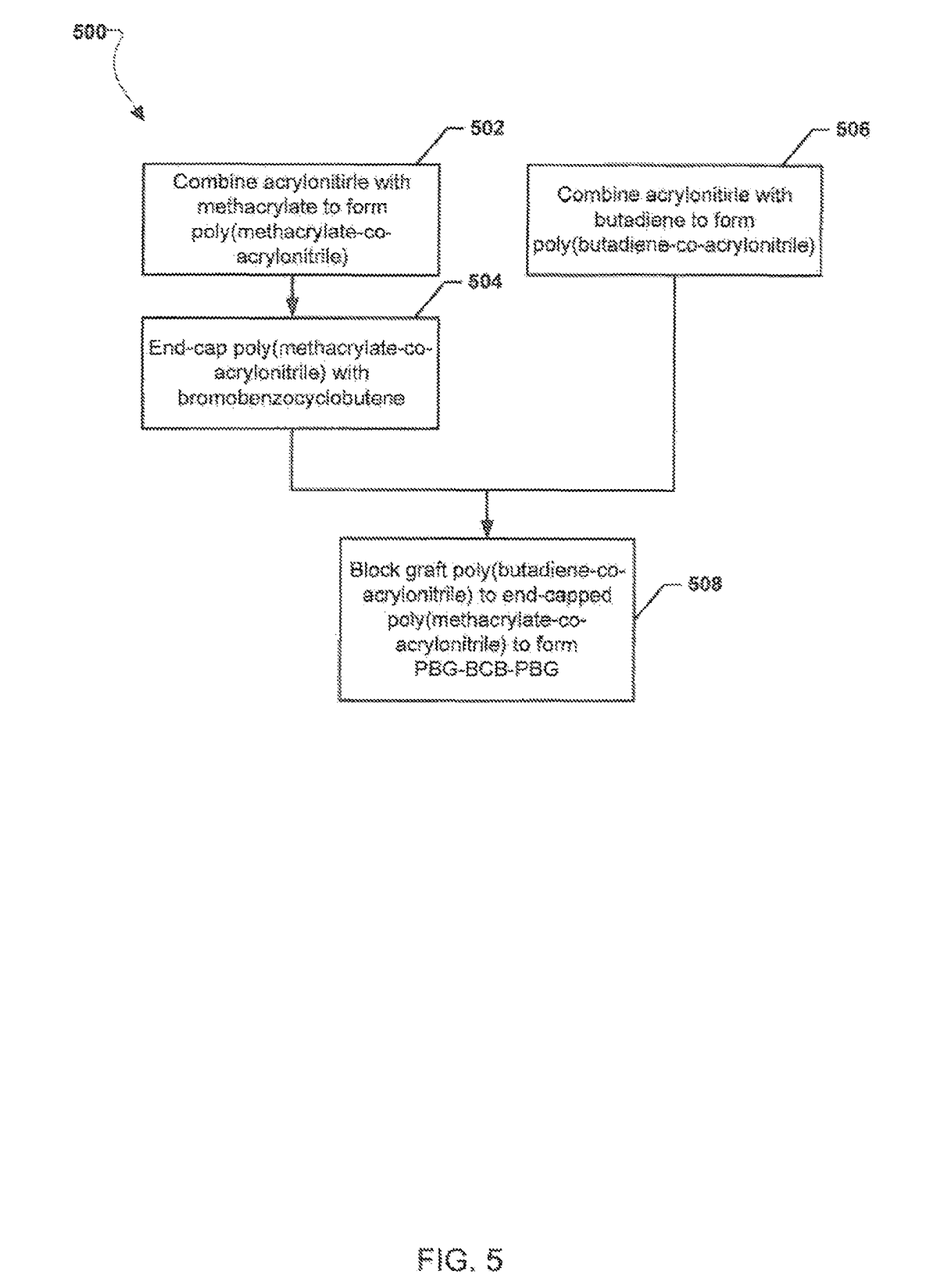
FIG. 5 is a flow chart describing the method illustrated in FIG. 4.

FIG. 5 summarizes the method 500 for synthesizing PBG-BCB-PBG illustrated in FIG. 4. In step 502 acrylonitrile may be combined with methacrylate to form poly (methacrylate-co-acrylonitrile). In step 504 the poly(methacrylate-co-acrylonitrile) may be end-capped with bromobenzocyclobutene. In step 506 acrylonitrile may be combined with butadiene to form poly(butadiene-co-acrylonitrile). In step 508 the poly(butadiene-co-acrylonitrile) may be block grafted to the bromobenzocyclobutene end-capped poly(methacrylate-co-acrylonitrile) to form PBG-BCB-PBG.

Figure 6:
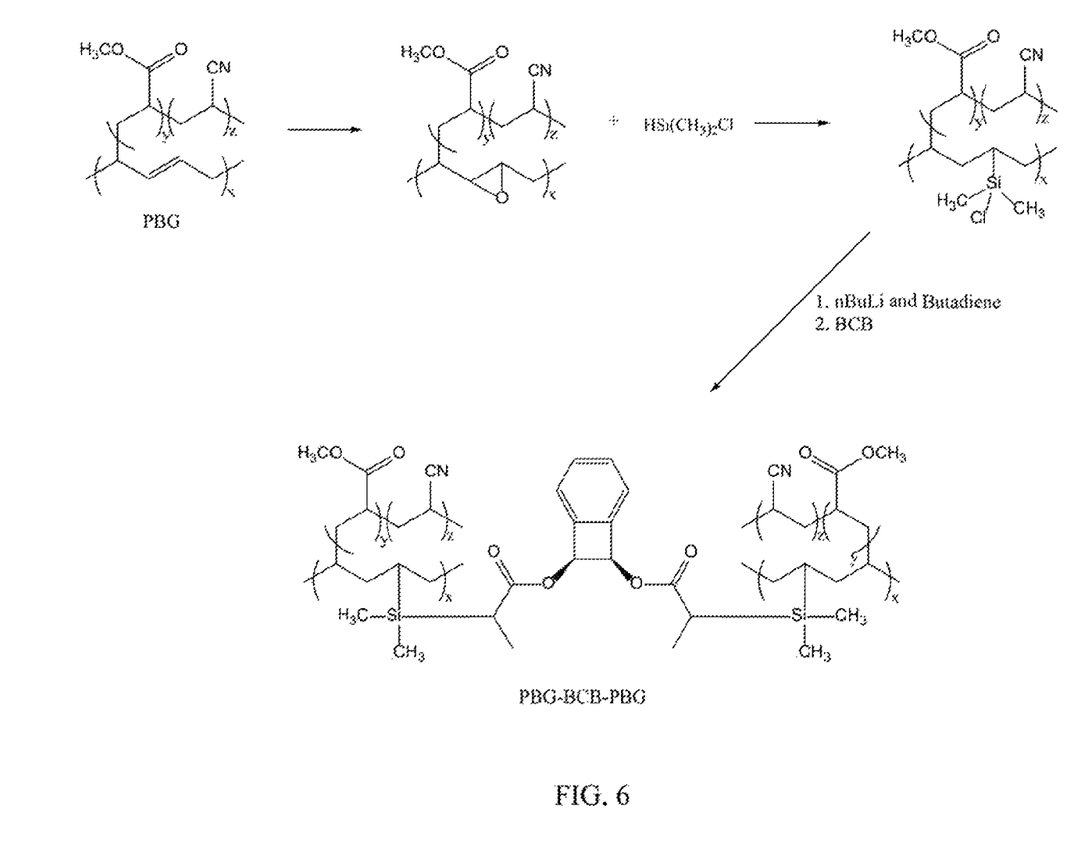
FIG. 6 illustrates a method of synthesizing PBG-BCB-PBG using side-group chemistry of a hydrosilylation reaction and living anionic polymerization according to an embodiment.

FIG. 6 illustrates a scheme showing side-group chemistry of a hydrosilylation reaction and living anionic polymerization according to an embodiment. In an embodiment synthesis of PBG-BCB-PBG, in a first reaction may involve an epoxidation of the alkene bond on the grafted copolymer, poly(butadiene-co-acrylonitrile) on the PBG polymer backbone. The reagents $Bu^tO_2H$ and $[MoO_2Cl_2(3\text{-diethoxyphosphorylcamphor})]$ may be utilized in the epoxidising reaction. In a second reaction, the epoxide may be ring opened by chlorosilanes. A living anionic polymerization may be carried out with the PBG functionalized with chlorosilane groups which may be coupled with living anions of poly (butadiene) and end-capped with the mechanophore, bromocyclobutene to yield the corresponding PBG-BCB-PBG mechanophore linked polymer. In the corresponding PBG-BCB-PBG mechanophore linked polymer, x may range from 5-15 mol %, y may range from 75-85 mol %, and z may range from 15-25 mol %.

Figure 7:
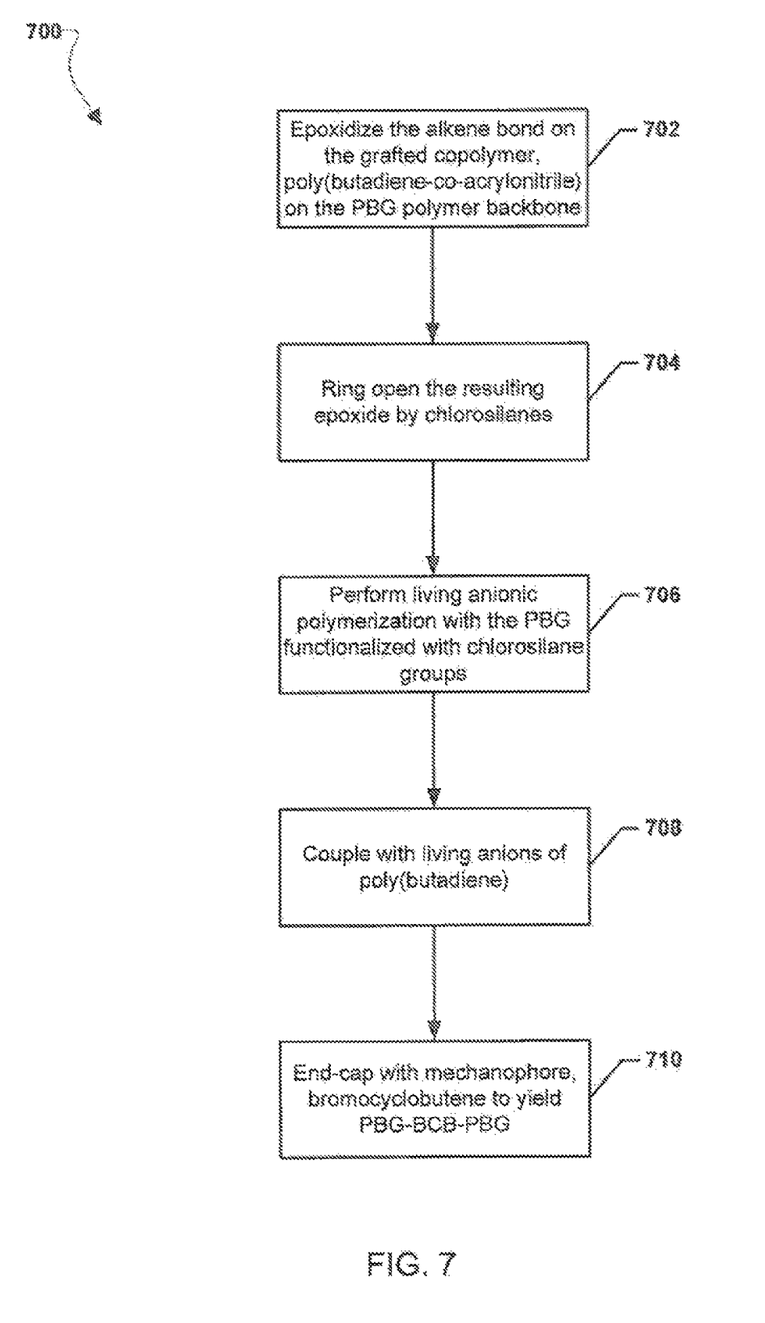
FIG. 7 is a flow chart describing the method illustrated in FIG. 6.

FIG. 7 summarizes the method 700 for synthesizing PBG-BCB-PBG illustrated in FIG. 6. In step 702 the alkene bond on the grafted copolymer, poly(butadiene-co-acrylonitrile) on the PBG polymer backbone may be epoxidized. In step 704 the resulting epoxide may be ring opened by chlorosilanes. In step 706 the living anionic polymerization may be performed on the PBG functionalized with chlorosilane groups. In step 708 the polymer may be coupled with living anions of poly(butadiene). In block 710 the polymer may be end capped with the mechanophore, bromocyclobutene to yield the corresponding PBG-BCB-PBG.

Figure 8:
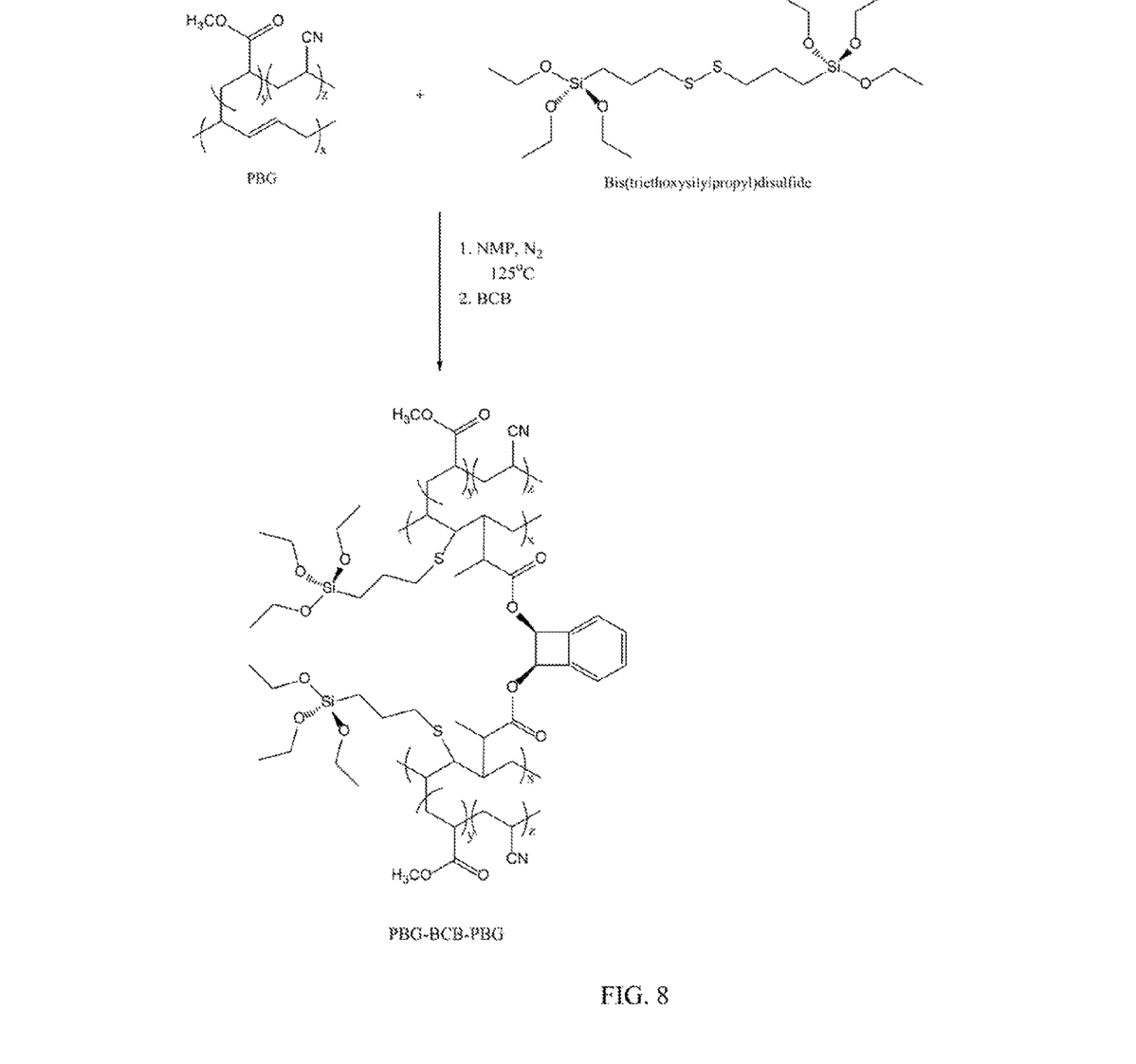
FIG. 8 illustrates a method of synthesizing PBG-BCB-PBG using side-group chemistry of vulcanization or cross linking according to an embodiment.

FIG. 8 illustrates a scheme showing side-group chemistry of vulcanization or cross linking according to an embodiment. The main goal of the scheme illustrated in FIG. 8 may be maintain the puncture healing properties of the PBG resin while adding the mechanophore to the resin in appropriate quantities to acquire desired bond forming properties. In the vulcanization or crosslinking embodiment of the method of forming PBG-BCB-PBG, a first step may involve a free radical polymerization or crosslinking/vulcanization of the PBG polymer. The targeted group may be the alkene on the grafted poly(butadiene-co-acrylonitrile) elastomer of the PBG polymers. The PBG polymer may be initiated with the free radical initiator bis(triethoxysilylpropyl)disulfide in the solvent N-methylpyrrolidone NMP at 125° C. under a strong flow of nitrogen (e.g., a positive flow of nitrogen where nitrogen is flowing out of the system so as to not allow air or moisture into the system). The mechanophore, bromocyclobutene, may be added as an end-capper to terminate the polymerization. In the resulting PBG-BCB-PBG mechanophore linked polymer, x may range from 5-15 mol %, y may range from 75-85 mol %, and z may range from 15-25 mol %.

Figure 9:
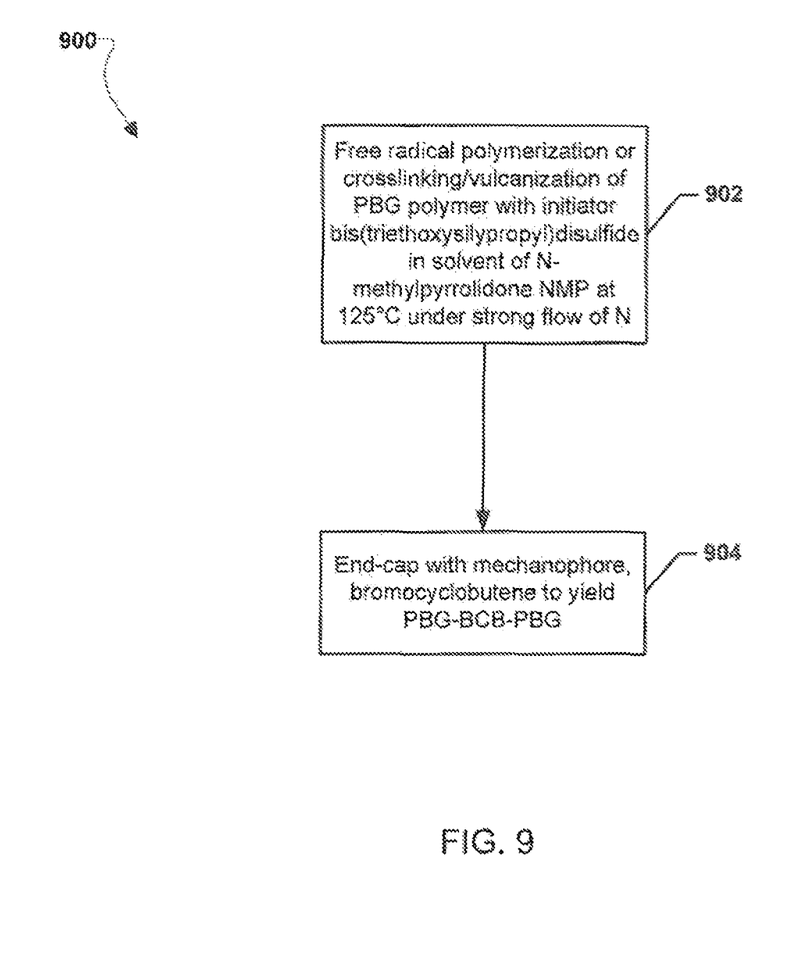
FIG. 9 is a flow chart describing the method illustrated in FIG. 8.

FIG. 9 is a flow chart summarizing the method 900 for synthesizing PBG-BCB-PBG illustrated in FIG. 8. In step 902 the PBG polymer may undergo free radical polymerization or crossliking/vulcanization with the initiator bis(triethoxysilypropyl)disulfide in a solvent of N-methylprrolidone NMP at 125° C. under a strong flow of nitrogen. In step 904 the resulting polymer may be end-capped with the mechanophore, bromocyclobutene to yield the corresponding PBG-BCB-PBG.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A PBG-BCB-PBG polymer comprising:
two polybutadiene-graft-poly(methyl acrylate-co-acrylonitrile) polymer (PBG) molecules bonded to a cis-1,2-bis(α-bromopropionyl)-1,2-dihydroxbenzocyclobutene (BCB) molecule to form the PBG-BCB-PBG polymer;
wherein the PBG-BCB-PBG polymer is a self-healing mechanophore linked polymer.

2. The polymer of claim 1, wherein the PBG-BCB-PBG polymer comprises:

3. The polymer of claim 1, wherein the PBG-BCB-PBG polymer comprises:

wherein 15 mol %≤x≤25 mol %, 75 mol %≤y≤85 mol %, and 5 mol %≤z≤15 mol %.

4. The polymer of claim 1, wherein the PBG-BCB-PBG polymer comprises:

wherein 5 mol %≤x≤15 mol %, 15 mol %≤y≤25 mol %, and 75 mol %≤z≤85 mol %.

5. The polymer of claim 1, wherein the PBG-BCB-PBG polymer comprises:

wherein 5 mol % ≤ x ≤ 15 mol %, 15 mol % ≤ y ≤ 25 mol %, and 75 mol % ≤ z ≤ 85 mol %.

* * * * *